United States Patent [19]

Lang et al.

[11] 4,170,881
[45] Oct. 16, 1979

[54] METHOD OF AND APPARATUS FOR THE CONCENTRATION OF CRYSTALLIZABLE LIQUID

[75] Inventors: Udo Lang, Munich; Franz Gruber, Bruhl; Satish Anand, Deisenhofen; Wilhelm Lehmer, Munich, all of Fed. Rep. of Germany

[73] Assignee: Linde Aktiengesellschaft, Wiesbaden, Fed. Rep. of Germany

[21] Appl. No.: 803,116

[22] Filed: Jun. 2, 1977

[30] Foreign Application Priority Data

Jun. 4, 1976 [DE] Fed. Rep. of Germany ...... 2625297

[51] Int. Cl.² .............................................. B01D 9/04
[52] U.S. Cl. ........................................ 62/538; 62/123; 62/544

[58] Field of Search .......................... 62/532, 538, 539

[56] References Cited

U.S. PATENT DOCUMENTS

| 3,279,200 | 10/1966 | Swiger | 62/532 |
| 3,411,309 | 11/1968 | Skrebowski et al. | 62/538 |

*Primary Examiner*—Norman Yudkoff
*Attorney, Agent, or Firm*—Karl F. Ross

[57] ABSTRACT

Crystallizable liquid solutions (i.e. solutions with crystallizable solvents) are concentrated by passing them between two cooled surfaces in a direction transverse to the action of gravity, the crystals being removed from the liquid substantially continuously over the entire length of the path. The surfaces are vibrated to prevent accumulation of crystals.

10 Claims, 5 Drawing Figures

METHOD OF AND APPARATUS FOR THE CONCENTRATION OF CRYSTALLIZABLE LIQUID

FIELD OF THE INVENTION

The present invention relates to a method of and to an apparatus for the thickening of solutions and, more particularly, to the treatment of a solution containing a crystallizable solvent by cooling to separate crystals from the solution and producing an inspissate or concentrated solution therefrom.

BACKGROUND OF THE INVENTION

In many cases with crystallizable liquids, e.g. aqueous solutions, it is desirable to thicken the solution and separate out therefrom, at low temperatures, crystals, e.g. of ice, and produce an inspissate or concentrate. Depending upon the application, the product of interest may be the inspissate or the crystals. For example, in the desalination of water, ice crystals may be recovered and melted to produce salt-free water starting from brine. In chemical processes, the concentrated solutions may be desirable as a mother liquor for salt formation or the like.

One technique for producing a concentrate from a relatively dilute solution with recovery of crystals, is to subject the solution to low temperature, i.e. a temperature below the freezing point of the solvent, by contact with cooled heat exchange surfaces, to cause the crystals to form. To this end, the solution is passed through a heat exchanger which, in order to prevent accumulation of the deposits upon these surfaces and thereby interfere with the heat exchange, can be vibrated or can have surfaces subjected to vibration. As a result, the crystal deposits can be dislodged from the cooling surfaces and can be recovered.

The most common practice in this field, especially in the case of the treatment of aqueous solutions by the freezing out of ice crystals, is to pass the solution upwardly through a heat exchanger having a plurality of vertical tubes (i.e. a tube-bundle heat exchanger). The solution is introduced at the lower end of this heat exchanger and flows threough the tubes in counterflow to a descending stream of a coolant which traverses the spaces between the tubes. The upwardly flowing liquid carries with it any ice which is formed upon the cooled surfaces of the tubes and both the ice and the concentrated liquid are recovered at the upper end of the tube bundle.

Since a layer of ice has a very low coefficient of conductive heat transfer, the formulation of ice layers upon the walls of the tubes which provide the indirect heat exchange between the coolant and the liquid poses a problem. To prevent the formation of the ice layers or to break these layers loose from the walls of the tubes as the ice is formed, it is a common practice to impart vertical oscillation to the tubes. These oscillations or vibrations effectively displace the surface of the pipe or tube relative to the liquid or crystals at the interface, relying upon the inertia of the crystals or liquid which cannot follow readily the movements of the heat exchange surfaces. Problems are frequently encountered when the tubes of a tube-bundle heat exchange are vibrated and shear forces are established because of the inertia of the liquid and crystals and the vibratile movement of the pipe walls. Furthermore, efficient freezing operations with systems of this type have required numerous freezing stages in cascade with intervening removal of the ice to prevent problems with entrainment of large volumes of ice through the pipes by the liquid to be concentrated.

OBJECTS OF THE INVENTION

It is, therefore, the principal object of the present invention to provide an improved method of and apparatus for the thickening of solutions and especially the freezing of crystals therefrom, whereby the aforementioned disadvantages are obviated or reduced in significance.

It is another object of the invention to provide a methof of freezing crystals from a liquid and forming the inspissate therefrom with high energy economy using a low-cost apparatus and in a far more efficient manner than has characterized earlier systems for a similar purpose.

Still another object of the invention is to provide an improved apparatus for concentrating a liquid with recovery of crystals therefrom which is more efficient than earlier arrangements and is free from the disadvantages of prior-art systems as enumerated above.

SUMMARY OF THE INVENTION

These objects are attained and, more specifically, a liquid can be thickened with crystal recovery in a far more simple manner than heretofore, by introducing the solution between the heat-exchange surfaces in a direction substantially transverse to the action of gravity, i.e. substantially horizontally, and passing the solution in this direction along a path of extended length while removing the crystals from the solution substantially continuously over the length of the path. For the purposes of the present invention, the expression "removing the crystals continuously from the liquid" is intended to mean removal of the crystals from the interface between the heat-exchange surfaces and the liquid and not necessarily removal of the crystals from contact with the liquid as will be discussed below.

Naturally, the "removal" in this sense can include actual separation of the crystals from the liquid or merely deposition of the crystals on the floor of the vessel or accumulation of the crystals in the upper surface of the body of liquid, the crystals in either case passing away from the aforementioned interface.

Because the solution is introduced and displaced substantially transversely to the gravitational force according to the invention, the crystal (solid) component which is formed at the interface between the liquid and the cooling surfaces tend to move upwardly or downwardly, depending on the relative densities of crystals and liquid and hence substantially vertically, i.e. in a direction perpendicular to the flow of liquid along the path.

There is, consequently, a self-separation of the crystals from the liquid. If, as in the case of ice, the crystals have a density lower than that of the liquid, they will rise to the surface of the body of liquid. On the other hand, if the liquid is highly concentrated or the crystals have a higher intrinsic density than that of the liquid, the crystals may fall to the bottom. In both cases the crystals are separated from the solution along the entire length of the path of the latter in a continuous manner. As a result, the liquid does not entrain the crystals to the end of its path.

According to a feature of the invention, the removal of the components crystallized from the solution over the length of the flow path of the latter is effected in dependence upon the concentration of the solution adhering to the recovered crystals. During the movement of the liquid along the path, the concentration of the solution, because of the crystallization of the solvent, i.e. ice, from the solution increases continuously. As a result, the liquid adherent to the recovered crystals is of a concentration which reflects the concentration of the liquid in the region from which the crystals were removed and it is possible to use the concentration of the adherent liquid as a control parameter for the crystallization process.

Consequently, the liquid that adheres to the crystal components which are recovered at the beginning of the flow path have a reduced concentration while the liquid recovered with the crystals at later portions of the flow path, e.g. toward the end thereof, have a proportionately higher concentration.

If, in accordance with the present invention, the crystallized component is removed at various locations along the flow path, the liquid adherent thereto can be separated from the crystal components, e.g. in centrifuges, with the liquid being returned at each stage to the region of the flow path of corresponding concentration. Consequently, the recovered solution of low concentration can be reintroduced at an early portion of the flow path while the recovered liquid of higher concentration can be introduced close to the end of the flow path within the concentrating vessel. This markedly improves the economy of the process.

According to still another feature of the invention, the concentration of the liquid at one or more locations of crystal recovery can be evaluated after separation of the liquid from the crystals and the resulting parameter used to control the operation of the process, e.g. by varying the temperature of the cooling surfaces, the degree of vibration or the rate at which the liquid is caused to traverse the length of the flow path.

It has also been found to be advantageous if, during the removal of the crystallized components, the crystals entraining liquid of lower concentration are caused to deposit on top of the crystals to which liquid of higher concentration is adhered, the resulting mixture having superimposed layers of crystals with adherent liquid of progressively reduced concentration from top to bottom being thereafter subjected to centrifugation or some other process to remove the adherent liquid from the crystals. Most surprisingly, this step results in a prewashing of the crystal components, thereby simplifying the removal of the adherent solution therefrom.

According to a further feature of the invention, the generation of relative movement between the solution and the heat exchanger surface, i.e. the cooling surfaces, by vibration means is effected intermittently. In other words, the vibration is not applied continuously to the cooling surfaces but in periods of vibration followed by quiescent or no-vibration periods. This has the advantage that the heat transfer between the heat-exchanger surfaces and the liquid increases sharply during the rest periods or zero-vibration periods because of the interruption of the cavitation phenomenon at the interface which has a tendency, during the vibration periods, to reduce the heat transfer. Naturally, during periods of increased heat transfer, the crystal growth is promoted.

Since the crystals tend to freeze more easily onto the heat exchange surfaces during the aforementioned rest periods and the crystal layer thus formed tends to reduce the heat transfer across the interface, it has been found to be desirable to make the rest periods of the vibration devices less than the time required for bridging of the juxtaposed heat exchange surfaces by the crystal component.

According to still another feature of the invention, the vibrated heat exchange surfaces, i.e. cooling plates or walls flanking the flow path, are oscillated with variable frequency. This has the advantage that there is a reduced cavitation effect at low frequencies so that at these periods of lower frequency, the increased heat transfer described above can prevail. At higher frequencies, the crystal components are more readily dislodged from the heat exchange surface. Of course, when variable-frequency vibrations are applied, these vibrations can be used with or without interruption in the manner described above.

According to yet another feature of the invention, a vibration is imparted to the liquid independently of the vibration imparted to the heat exchange surfaces to further preclude the possibility of firm attachment of the crystals to these surfaces. The two independent vibration devices can be operated alternately or concurrently. Best results are obtained during alternate operations of the two vibrating systems, the rest periods of the vibrators for the heat exchange surfaces enabling increased heat transfer, although freezing of the crystal component to these surfaces is restricted during this rest period by the vibrations imparted to the body of liquid traversing the flow path. The latter vibrations, of course, are superimposed upon the inertial forces and the flow forces which also tend to restrict freezing of the crystals firmly onto these surfaces.

According to another aspect of the invention, the process is carried out in a concentrating tank having a plurality of upright heat exchange surfaces connected to a vibrator and disposed in the tank so that the solution is introduced between pairs of these surfaces substantially transverse to gravitational force.

Above or below the flow path there is provided a space enabling the continuous upward or downward movement of the crystals depending upon their specific gravity relative to the specific gravity of the liquid to be concentrated.

The heat exchange surfaces are formed as vertical internally cooled plates which can be traversed by a refrigerant or a cold-carrying fluid, the plates being mechanically coupled together rigidly and connected to a common vibrating device. Alternatively, the plates may be individually mounted for vibratile movement within the tank and can be provided with respective vibrators.

The solution is introduced horizontally into the tank and passes continuously horizontally between the plates while the crystals which are frozen out of the solution rise to the aforementioned free space which extends continuously along the path.

It has been found to be advantageous when the tank is constituted with a rectangular configuration and provided with an opening above and/or below. In a first end wall of the tank along the side thereof adjacent one of the longitudinal walls, there is provided an inlet for the solution to be concentrated while an outlet for the concentrate is provided in the second end wall adjacent the opposite longitudinal wall of the tank so that the inlet and the outlet lie diagonally opposite one another across the tank. In this embodiment, the concentrate can be removed separately from the crystals moving to the upper surface of the body of liquid or to the bottom of the tank by gravitational action. The solution to be concentrated is passed continuously through the tank from the inlet to the outlet. If, in this embodiment, the refrigerant or coolant is introduced into the plates at the same side as that containing the inlet for the solution to be concentrated, optimum cooling and freezing effects are obtained.

In a particularly preferred embodiment of the invention, the plates are disposed parallel to one another and successive plates in the array are longitudinally offset so that, for example, the first plate in the array is spaced from the aforementioned first longitudinal side of the tank but is sealingly and elastically connected to the first end wall thereof, the opposite end of the plate being spaced from the second end wall by a distance corresponding substantially to the distance between the first plate and the longitudinal wall of the tank. The second plate in the array is connected resiliently and elastically by a seal to the second end wall and has its free end spaced from the first end of the tank by a distance equal to the spacing between the plates. This alternation of plates is continued to define a looping flow path for the liquid which is of substantially constant flow cross-section over its entire length. In addition, each of the plates is sealingly and elastically connected to the bottom of the tank.

As a result of this construction, the liquid traverses a looping or back-and-forth flow path with substantially consant flow velocity through the tank, thereby affording a high residence time and, in addition, providing, corresponding to the number of plates, a multiplicity of freezing zones in a single tank unit. The first freezing zone is constituted by the stretch of the path along the first longitudinal wall of the tank and the first plate from the inlet. Over this first freezing zone or stretch, a portion of the solvent, e.g. water, is frozen as ice and is recovered from the surface of the liquid. In the second freezing zone, in which the liquid is diverted back to the first end of the tank, between the first plate and the second plate, additional ice is frozen out of the solution and the concentration of the solution increases. This process is repeated from zone to zone corresponding to the number of plates and the highly concentrated liquid is obtained at the outlet after passing between the last plate and the second longitudinal wall of the vessel through the last freezing zone.

Over the entire path, therefore, the crystals rise to the surface and can be displaced toward the second end of the tank where the crystals are collected in a trough which is preferably inclined downwardly from the last zone to the first zone. As a result, the crystals having highly concentrated liquid adherent to them are covered, as they pass down this trough, with crystals having progressively less concentrated liquid adherent to them.

Of course, outlets can be provided in the second end wall at the second, fourth, or any other freezing zone, the number of freezing zones can be increased to any even number desired and similar modifications can be provided with respect to the height of the freezing zone depending upon the degree of concentration required and the quantity of liquid to be processed.

Advantageously, means is provided to sweep the accumulated crystals from the collecting space toward the second end wall of the tank, this sweeping device having members which project downwardly between the individual plates, i.e. a comb, penetrating the liquid flowing along the looping path to the desired depth. The return of th displacing means is effected without immersion in the solution.

The displacement device prevents bridging of the cooling plates by the ice collected at the top of the body of liquid in the tank and hence eliminates any need to increase the capacity of the vibrating device to break up bridging in the collecting space.

It is possible, in accordance with the present invention, to recover the crystals from each freezing zone separately so that these crystals can be removed separately from their adherent liquid and the adherent liquid from each zone returned to this zone.

Naturally, the displacing device can be modified so as to sweep the crystals in the first, third, fifth . . . zones toward one end of the tank during one stroke of the displacing device and to sweep the crystals in the second, fourth, sixth . . . zones to the opposite end of the device. Separate collecting means is in this case provided at each end of the tank.

Bridging of the cooling plates by the accumulating ice crystals can be prevented by determining the depth to which the displacing device penetrates between each pair of plates in accordance with the level of the liquid passing therebetween.

Along the discharge side, i.e. along at least the second end wall of the tank, there is provided a recovery trough for the crystallized component which is inclined downwardly from the high-concentration side of the tank to the low-concentration side thereof. When the discharge device operates in both directions, each end of the tank is provided with such a trough. The crystal component which is discharged over the edge of the tank into the or each trough thus enters the latter with adherent liquid of a concentration corresponding to that in the respective freezing zone. In other words, at the side of the tank constituting the last freezing zone, the concentration of the adherent liquid is greater than at each zone up to the last zone.

Because of the inclination of the trough, the crystals with adherent liquid of progressively lower concentration are deposited upon crystals having adherent liquid of higher concentration so that the crystals are subjected to a prewashing before being separated from the adherent liquid. The trough can be provided with a perforated or expanded-metal bottom enabling a portion of the liquid to be recovered before the crystals are introduced into the centrifuge.

According to another feature of the invention, the plates are provided with strip-like zones of low thermal conductivity, e.g. by applying to the plates low-conductivity strips. These strips have the advantage that they prevent, because of the reduced heat exchange, crystals from forming and adhering to the plates when the apparatus is operated such that, in spite of the vibration, there is some tendency for such adhesion. The strips appear to facilitate the separation of the crystals from the plates.

The zones, moreover, facilitate a significant and intense convective material exchange from the solution to the cooling surfaces and back.

To alternately impart vibration to the heat exchange surfaces and the solution, the bottom of the tank can be formed by a membrane which is connected to a second vibrating device. A controller can operate the two vibrators alternately and permit each to operate at variable frequency and with adjustable ON times and OFF times.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
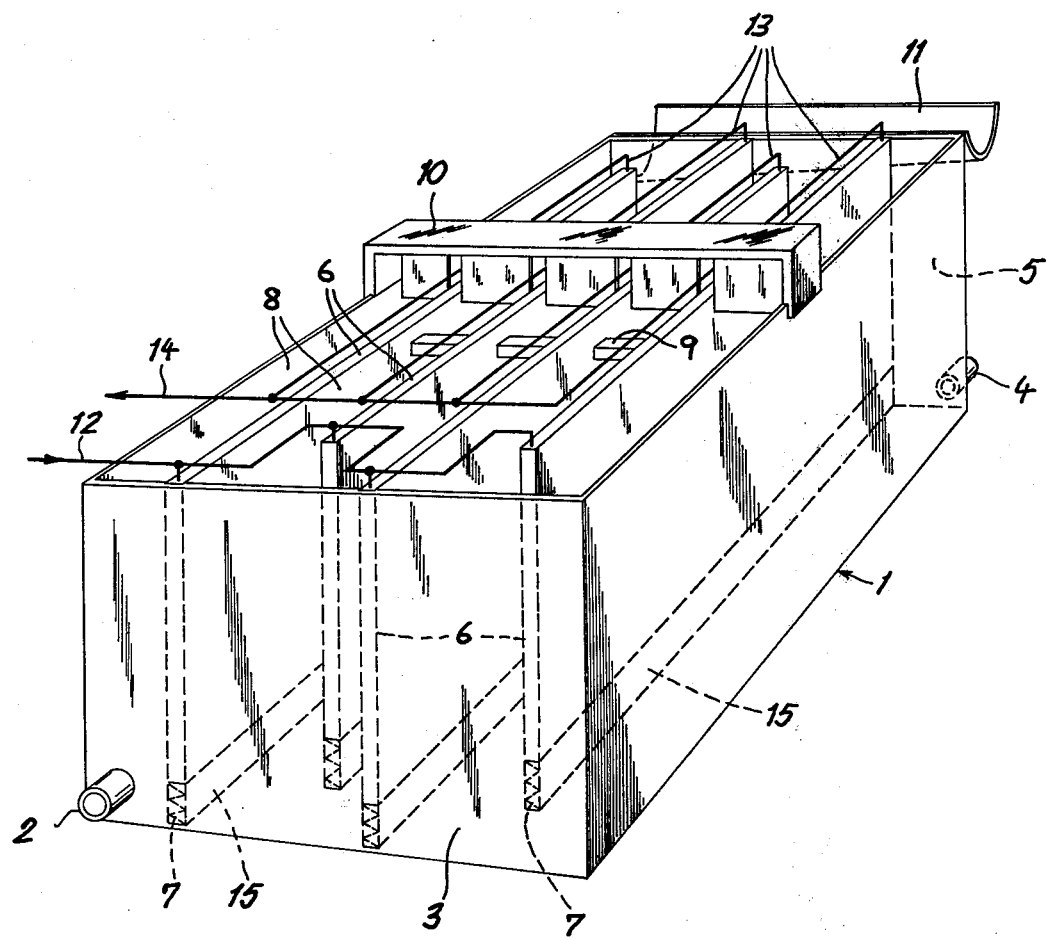
FIG. 1 is a diagrammatic perspective view of an apparatus for carrying out the process of the invention in the concentration of a solution by freezing out of crystals of the solvent.

FIG. 1 of the drawing shows a rectangular tank 1 having an inlet 2 for the solution to be concentrated at a lower corner of a first end wall 3. An outlet 4 for the concentrate is provided in the second end wall 5 at a lower corner of the tank diagonally opposite the inlet 2.

Within the tank 1 there are provided a plurality of vertical parallel plates which, in turn, are parallel to the longitudinal walls of the tank and are represented at 6. The plates 6 can be traversed in a conventional manner by a refrigerant or cold carrier, e.g. brine, and are each attached by elastic sealing means to one end wall but spaced from the opposite end wall. The plates are spaced from the longitudinal walls of the tank and each other by the same distance.

Because of the vertical arrangement of the plates 6 in the tank 1, a throughgoing space 8 is provided between the plates 6 in the direction of gravitational force, in this case upwardly, to permit the crystallized component to rise to the surface of the liquid passing along the looping path between the plates. In this embodiment, the crystal component is ice which may be frozen out from the solvent, namely, water, of the solution. The ice, of course, rises because of its lower density.

As previously described, the individual plates 6 are alternately offset in the longitudinal direction so that each pair of neighboring plates alternately is fixed to one end wall while the other plate of the pair is fixed to the other end wall 3, 5, for example, in a groove by an elastic sealing element.

Figure 4:
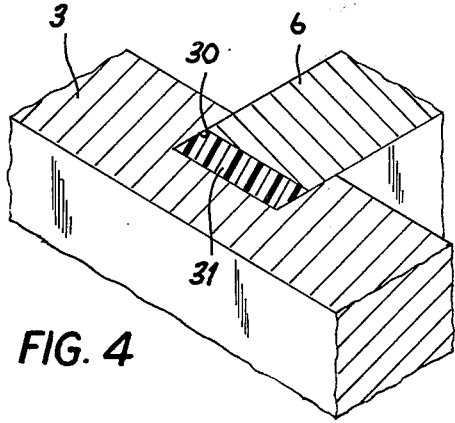
FIG. 4 is a cross-sectional perspective view diagrammatically illustrating the connection of one of the cooling plates with an end wall.

In FIG. 4, the plate 6 is shown to be received in a groove 30 of an end wall 3 and to be sealed therein elastically by a sealing strip 31.

The free ends of the plates terminate at the same distance from the opposite end wall as the spacing between the plates. As a result, a looped horizontal path is provided for the liquid to be concentrated through the tank 1 from the inlet 2 to the outlet 4.

This path includes a first freezing zone or stretch between the first plate 6 and the left-hand longitudinal wall shown in FIG. 1, a succession of cooling zones or stretches between the pairs of plates, and a final or last cooling zone between the last plate 6 and the right-hand longitudinal wall of the tank as shown in FIG. 1.

It will be self-understood that a loop-shaped path for the liquid can be formed with other tank configurations and other arrangements of the plates. For example, a hexagonal tank can be provided with a star-shaped array of plates reaching toward, but terminating short of, the corners between the vertical walls of the hexagonal tank. From the midpoint of each wall of the tank, a further plate can reach toward the center of the tank, terminating short of the support for the star-shaped array of plates.

It is also possible to form the looping path by an appropriate configuration of the tubes of a tube-bundle heat exchanger instead of by plates as described.

The coolant or refrigerant is introduced into the plates 6 through a thermally insulated manifold 12 disposed along the end of the tank having the first end wall 3, the refrigerant being pumped through the plates and being recovered by lines 13 which extend along the plates and terminate in a discharge manifold 14 disposed adjacent the first manifold 12.

The plates 6 are mounted upon vibratile elements 7 which connect the plates sealingly with the bottom of the tank 1 to permit vibration of the plates 6 which are rigidly connected by a transverse member 9. The vibration device has not been shown in this Figure but may be of the type illustrated in FIG. 2. Between the lower edges of the plates and the tank bottom, further elastic sealing means 15 can be provided.

Along the upper edge of the tank 1 there is mounted a crystal-discharge device 10 of comb configuration, the plates of the blade 10 reaching downwardly between the plates 6 and between the end plates and the respective longitudinal wall of the tank. This displacing device 10 can be shifted toward the trough 11 to entrain the crystals over the edge of the tank into the trough. The trough 11 is inclined downwardly toward the low-concentration cooling zone.

In operation, the plates 6 are vibrated, preferably intermittently and with variable frequency while the liquid to be concentrated is introduced through the inlet 2, the concentrate being removed through the outlet 4. Consequently, the liquid moves at a substantially constant velocity in a horizontal path between the plates and ice crystals are frozen out of the liquid and rise to the surface. The device 10 is operated periodically to sweep the collected crystals into the trough. Since the crystals having high-concentration adherent liquid are introduced at the upper end of the trough and flow downwardly therethrough, the crystals with progressively lesser-concentration adherent liquid are disposed on top of the crystals having higher-concentration adherent liquid to effect the prewashing described above.

Figure 2:
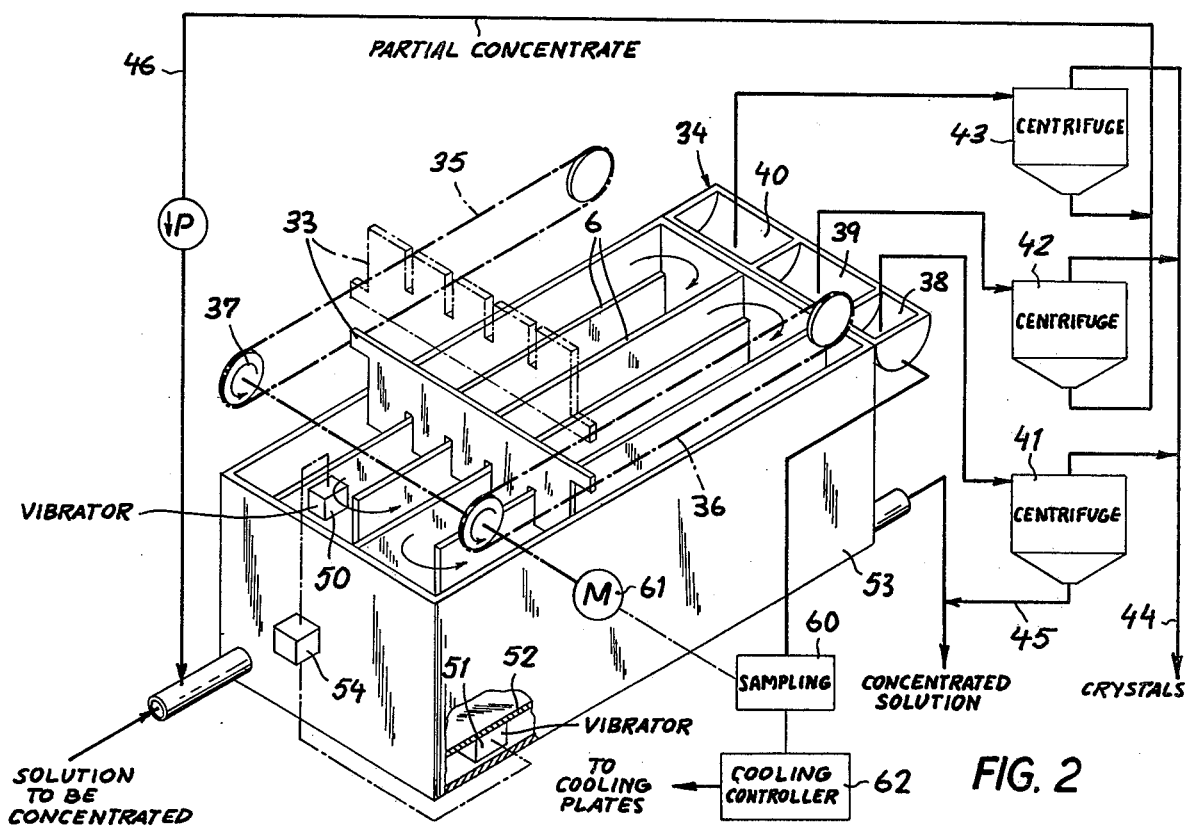
FIG. 2 is a view similar to FIG. 1 illustrating another embodiment of the invention.

In the embodiment of FIG. 2, in which most of the structural elements correspond to those of FIG. 1, there can be seen a blade 33 for sweeping the crystals toward the trough 34. The blade 33 is carried upon a pair of conveyors 35, 36 which are displaced in the direction of arrow 37 so that the blade always sweeps from left to right along the tank. Upon reaching the trough end of the tank, the blade is swung upwardly to return to the inlet end of the tank.

The trough 34 is subdivided into a plurality of sections 38, 39, 40, each of which can be connected to a respective centrifuge 41, 42, 43 to separate the crystals from the adherent liquid. As can be seen in FIG. 2, moveover, the crystals are accumulated at 44 while the higher-concentration adherent liquid is combined with the concentrated solution at 45. The lower-concentration adherent liquid is returned at 46 to inlet to the tank or to any other freezing zone as required.

The plates 6 are here provided with a vibrator as represented at 50, a further vibrator 51 being connected to a membrane 52 which is free to vibrate and forms the bottom of the tank 53. The vibrators 50 and 51 are connected to a control unit or timer 54 which operates them alternately to vibrate the plates and the body of liquid in the tank and with variable ON and OFF times.

It is possible to control the refrigerant flow through the cooling plates and thus cool the liquid as a function of the concentration of the adherent liquid on the crystals. A sampling device 60 can be provided for this purpose. The concentration is detected by the sampling unit 60 which can operate the motor 61 driving the blade 33 or a controller 62 regulating the flow of coolant to the plates.

The vibration devices illustrated in FIG. 2 can be mechanical or electromagnetic devices.

Figure 3:
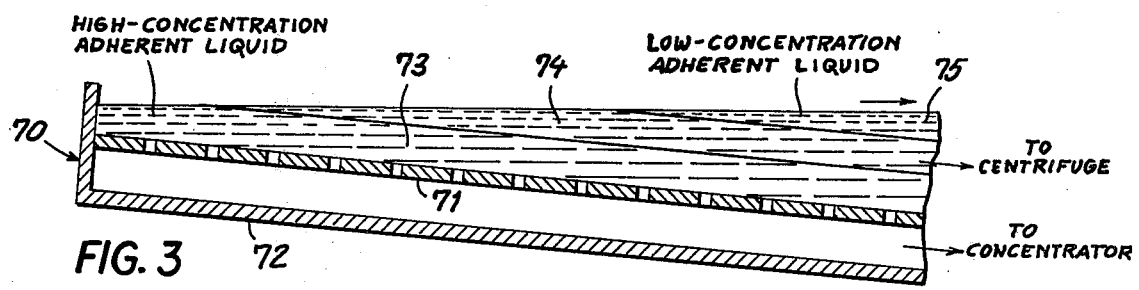
FIG. 3 is a cross-sectional view, also in diagrammatic form, illustrating a trough for collecting the crystals according to the invention.

In FIG. 3 there has been illustrated a trough 70 having a perforated floor 71 and an unperforated housing 72 through which liquid can be recovered. This trough has been shown diagrammatically and is inclined, as has been illustrated in FIG. 1, so that the crystal material 73 having a high concentration of adherent liquid is deposited first and is then covered by layers 74 and 75 of crystals having lower concentration of adherent liquid.

Figure 5:
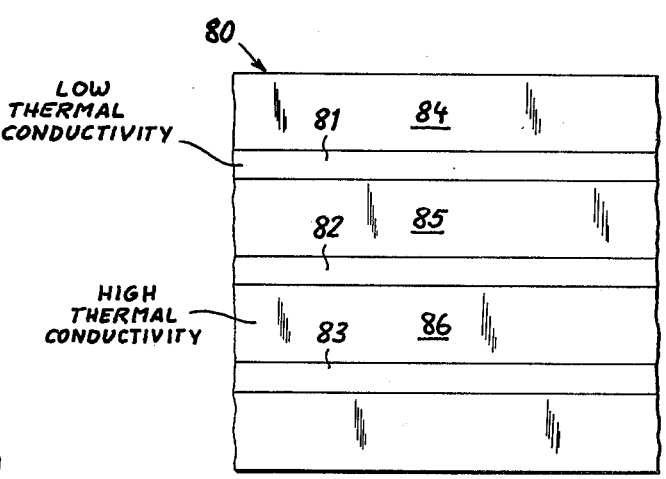
FIG. 5 is an elevational view of a portion of a plate provided with low-conductivity strips according to the invention.

In all of the embodiments illustrated, the cooling plate, here represented at 80, can be formed with strips 81, 82 and 83, e.g. of polyethylene, having a low thermal conductivity, the strips separating zones 84, 85 and 86 of high thermal conductivity from one another. The surfaces of zones 84–86 are composed of metal. This construction of each of the cooling plates has the advantages previously described of promoting convective flow between the liquid and the zones of high thermal conductivity, see FIG. 5.

We claim:

1. A process for the concentration of a solution by freezing crystals of a solvent therefrom, said process comprising the steps of:
   passing said solution between at least two heat exchange surfaces in a direction transverse to the action of gravity to freeze crystals from said solution and permit said crystals to accumulate by gravitational movement along said path;
   periodically displacing said surfaces by the delivery of energy thereto from a source outside said solution to impart relative vibratory movement to said solution and said surfaces; and
   recovering the accumulated crystals from the liquid along said path, the recovery of the crystals from the solution along said path being effected in dependence upon the concentration of the liquid adherent thereto.

2. A process for the concentration of a solution by freezing crystals of a solvent therefrom, said process comprising the steps of:
   passing said solution between at least two heat exchange surfaces in a direction transverse to the action of gravity to freeze crystals from said solution and permit said crystals to accumulate by gravitational movement along said path;
   periodically displacing said surfaces by the delivery of energy thereto from a source outside said solution to impart relative vibratory movement to said solution and said surfaces; and
   recovering the accumulated crystals from the liquid along said path, said crystals being recovered by depositing crystals having adherent solution of lower concentration upon crystals having adherent solution of higher concentration to effect a prewashing of the crystals.

3. An apparatus for concentrating a solution by freezing out crystals of a solvent thereof, said apparatus comprising:
   a tank adapted to receive said solution;
   a plurality of heat exchange surfaces defining a flow path for said solution in said tank, said surfaces being cooled by a fluid;
   means for passing said solution along said path between said surfaces in a direction transverse to the effect of gravity, said path forming a space in which crystals of said solvent can accumulate by gravitational effect;
   means for relatively vibrating said solution and said surfaces; and
   means for recovering crystals accumulating in said space, said surfaces being formed by vertically disposed internally cooled plates rigidly connected together and provide with a vibrator, said tank having a rectangular configuration and is provided with first and second end walls and longitudinal walls interconnecting said end walls, said tank being formed with an inlet for said solution and said first end wall along one of said longitudinal walls and with an outlet for said solution in said second end wall along the other longitudinal wall diagonally opposite said inlet, said plates being disposed parallel to one another and are relatively longitudinally offset alternatively so that alternate plates are connected to said first end wall and the remaining plates are connected to said second end wall, said plates being provided between the respective end walls and between a bottom of said tank with elastic sealing elements so as to enable vibration of said plates relative to said walls of said tank, each of said plates connected to one end wall terminating short of the other end wall by a distance substantially equal to the distances between said plates whereby the flow path between said plates and said end wall is looped and of substantially constant flow cross section.

4. An apparatus for concentrating a solution by freezing out crystals of a solvent thereof, said apparatus comprising:
   a tank adapted to receive said solution;
   a plurality of heat exchange surfaces defining a flow path for said solution in said tank, said surfaces being cooled by a fluid;
   means for passing said solution along said path between said surfaces in a direction transverse to the effect of gravity, said path forming a space in which crystals of said solvent can accumulate by gravitational effect;
   means for relatively vibrating said solution and said surfaces; and
   means for recovering crystals accumulating in said space, said surfaces being formed by vertically disposed internally cooled plates rigidly connected together and provided with a vibrator, said tank having a rectangular configuration and is provided with first and second end walls and longitudinal walls interconnecting said end walls, said tank being formed with an inlet for said solution and said first end wall along one of said longitudinal walls and with an outlet for said solution in said second end wall along the other longitudinal wall diagonally opposite said inlet, further comprising means displaceable along said longitudinal walls in the direction of at least one of said end walls for displacing crystals from between at least some pairs of said plates toward said one of said end walls.

5. The apparatus defined in claim 4, further comprising a trough formed along said one of said end walls and receiving crystals from said tank, said trough being inclined downwardly from the longitudinal side of the tank provided with said outlet toward the longitudinal side of the tank provided with said inlet.

6. An apparatus for concentrating a solution by freezing out crystals of a solvent thereof, said apparatus comprising:
   a tank adapted to receive said solution;
   a plurality of heat exchange surfaces being cooled by a fluid;
   means for passing said solution along said path between said surfaces in a direction transverse to the effect of gravity, said path forming a space in which crystals of said solvent can accumulate by gravitational effect;
   means for relatively vibrating said solution and said surfaces; and
   means for recovering crystals accumulating in said space, said surfaces being formed by vertically disposed internally cooled plates rigidly connected together and provided with a vibrator, said tank having a rectangular configuration and is provided with first and second end walls and longitudinal walls interconnecting said end walls, said tank being formed with an inlet for said solution and said first end wall along one of said longitudinal walls and with an outlet for said solution in said second end wall along the other longitudinal wall diagonally opposite said inlet, said plates being formed with strips of reduced thermal conductivity.

7. An apparatus for concentrating solution by freezing out crystals of a solvent thereof, said apparatus comprising:
   a tank adapted to receive said solution;
   a plurality of heat exchange surfaces defining a flow path for said solution in said tank, said surfaces being cooled by a fluid;
   means for passing said solution along said path between said surfaces in a direction transverse to the effect of gravity, said path forming a space in which crystals of said solvent can accumulate by gravitational effect;
   means for relatively vibrating said solution and said surfaces; and
   means for recovering crystals accumulating in said space, said surfaces being formed by vertically disposed internally cooled plates rigidly connected together and provided with a vibrator, said tank having a rectangular configuration and is provided with first and second end walls and longitudinal walls interconnecting said end walls, said tank being formed with an inlet for said solution and said first end wall along one of said longitudinal walls and with an outlet for said solution in said second end wall along the other longitudinal wall diagonally opposite said inlet, the bottom of said tank being formed as a membrane, said membrane being provided with a vibrator for vibrating the solution along said path, said plates being provided with another vibrator.

8. The apparatus defined in claim 7, further comprising control means for alternately operating said vibrators.

9. A process for the concentration of a solution by freezing crystals of a solvent therefrom, said process comprising the steps of:
   passing said solution between at least two heat exchange surfaces in a direction transverse to the action of gravity to freeze crystals from said solution and permit said crystals to accumulate by gravitational movement along said path;
   imparting relative vibratory movement to said solution and said surfaces by imparting variable-frequency vibrations to said surfaces; and
   recovering the accumulated crystals from the liquid along said path.

10. A process for the concentration of a solution by freezing crystals of a solvent therefrom, said process comprising the steps of:
   passing said solution between at least two exchange surfaces in a direction transverse to the action of gravity to freeze crystals from said solution and permit said crystals to accumulate by gravitational movement along said path;
   imparting relative vibratory movement to said solution and said surfaces by alternately vibrating the solutions along said path and said surfaces; and
   recovering the accumulated crystals from the liquid along said path.

* * * * *